April 7, 1936.    R. F. PEO    2,036,234
LINK ASSEMBLY
Filed March 4, 1932
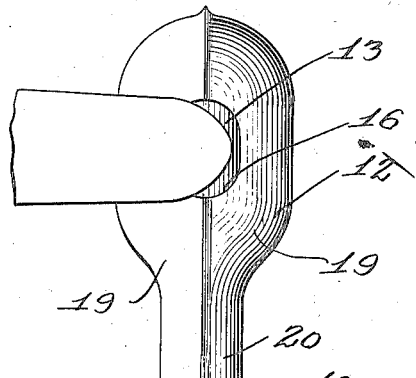
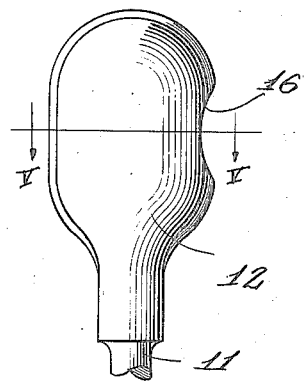
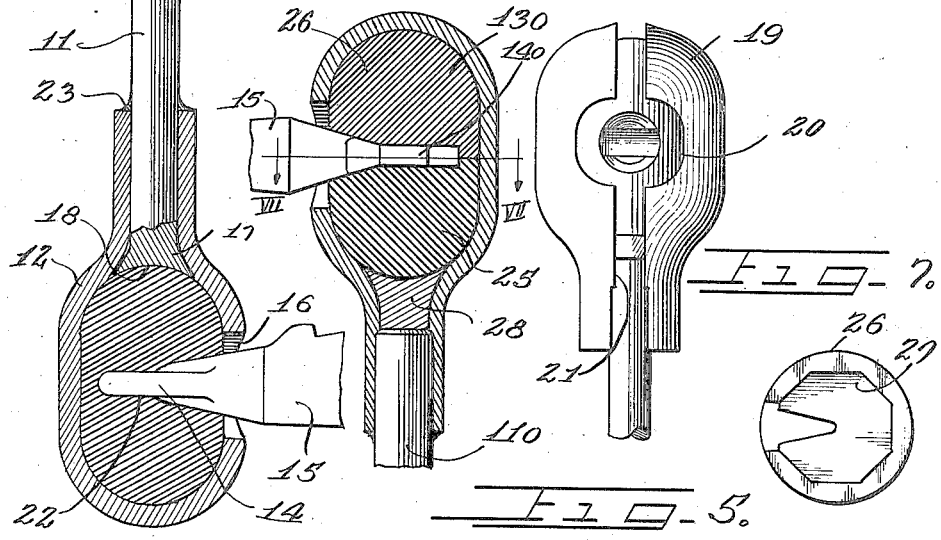
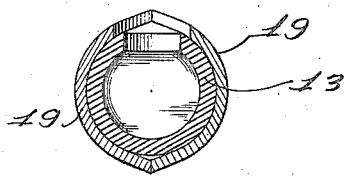
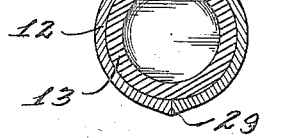
Inventor
Ralph F. Peo.

Patented Apr. 7, 1936

2,036,234

UNITED STATES PATENT OFFICE 2,036,234

LINK ASSEMBLY

Ralph F. Peo, Buffalo, N. Y., assignor to Houde Engineering Corporation, Buffalo, N. Y., a corporation of New York Application March 4, 1932, Serial No. 596,776

7 Claims. (Cl. 287—85)

This invention relates to connecting links having oscillatory joints and particularly to connecting links for use in automobiles.

This invention pertains to the type of drag link or connecting rod which has resilient bushinged joints at its ends for allowing limited angular and rotative movement.

It is an object of this invention to provide a drag link assembly of this type wherein the joint sockets are formed from inexpensive sheet metal material.

It is a particular object of this invention to provide a welded socket for a drag link joint which allows for the use of light material but which insures the rigidity necessary for such a joint.

It is also an object of this invention to provide a joint of the type described, wherein the bushing is molded with a stud receiving slot.

It is also a particular object of this invention to provide a joint of this type wherein the stud member has a flattened head for movement with a resilient bushing.

It is a still further object of this invention to provide a drag link assembly wherein the socket members are attached to the rod in a novel manner to permit of adjustment as to length and angular positioning of the socket members.

Other and further important objects of the invention will be apparent from the disclosures in the specification and the accompanying drawing.

This invention (in a preferred form) is illustrated in the drawing and hereinafter more fully described.

On the drawing:

Figure 1 is a plan view, partly in section, embodying my invention.

Figure 2 is a side elevational view of a socket member as shown in Figure 1.

Figure 3 is a fragmentary plan view of the drag link illustrating the method of forming a socket thereon.

Figure 4 is a view taken substantially on the line V—V of Figure 2 but showing the parts before they have been completely assembled.

Figure 5 is a sectional view taken substantially on the line V—V of Figure 2.

Figure 6 is a fragmentary sectional view of a modified form of socket member and stud.

Figure 7 is a plan view of a bushing section such as shown in Figure 6.

As shown on the drawing:

My invention is shown as embodied in a link, illustrated generally by the reference numeral 10, particularly adapted for use as a connection between the axle and shock absorber of an automobile. The link 10 comprises a rod member 11 having sockets 12 attached to the ends thereof. Resilient bushings 13 are mounted in the socket members 12 and receive the heads 14 of studs 15 which extend through apertures 16 in the sockets 12.

The member 11 is preferably formed from a metal rod which is cut to size and the ends of which are upset as shown at 17 and recessed as shown at 18 for a purpose hereinafter to appear.

The sockets 12 are formed from symmetrical shell sections 19. Each pair of shell sections, when placed together in abutting position forms the elongated sockets 12 and the semi-cylindrical extensions on the shells, are also brought into abutting position to form the necks 20 which closely receive the end 17 of the rod member 11. The upset ends of the rod member fit inside the sockets and serve as end pieces or seat members to prevent undue distortion of the bushings 13.

Referring to Figure 3, it will be seen that the shells 19 are provided with arcuate indentations or cuts along adjacent face edges which when the shells are placed in opposed relationship form the substantially oval openings 16. The adjacent face edges of the shells 19 have raised portions 21 which extend substantially about the recesses along a considerable extent. These raised portions 21 are flared outwardly as will be seen from reference to Figure 4. In assembling the socket member, the edges of the shells are projection welded or similarly secured together. The flared edges provide a greater welding area and this insures a tighter, firmer joint even where inexpensive sheet material is used in the formation of the shells 19.

Each socket 12 contains a resilient bushing 13 preferably made of rubber. This bushing 13 is molded into shape and with a recess at 22 for the reception of the head 14 of the stud 15. Both bushing 13 and socket 12 are of oblate spheroid shape, the bushing 13 being of such a size as to be firmly compressed within the socket. The recess 22 is just sufficiently large to snugly receive the stud head 14. As a result of this, the bushing is firmly secured and there is little tendency of surface movement between the stud and bushing or between the bushing and socket, the angular and rotative movement of the stud being permitted by the inter-particle flow of the material of which the bushing is composed.

It will be noted that in assembly, the recessed portion 18 of the rod 11 presses against the bushing 13. The large portion 17 of the rod 11 extends within the recessed portions of the shells 19 and as the shells are welded together about the rod, this enlarged portion 17 prevents longitudinal movement of the shell and also forms a seat for the bushing 13. To further insure a firm connection of the shell on the rod 11, the shell and rod are welded adjacent the end of the neck 20 as shown at 23.

Figures 4 and 5 illustrate the assembly of the socket member and bushing. In Figure 4, the shell sections are shown in abutting position fitting snugly about the bushing. The abutting edges are then welded as at 29 and at the same time are pressed against each other to compress the bushing members.

A slightly different modification of the invention is illustrated in Figure 6. In this case, the head 140 of the stud 15 is formed into the shape of a flat polyhedron and preferably has a hexagonal or octagonal cross-section.

The flat shaped stud is used as this fits the cavity in the bushing in such a manner as to substantially eliminate any tendency to cause slippage between the stud and the bushing as the former is moved with respect to the link. Also, this type of stud is more economical to manufacture as less metal is needed than in the case of the usual spherical stud and also the machining operations are cheaper. The cost is even less in the case of the octagonal cross sectioned stud as plane surfaces can be made cheaper and easier than curved surfaces.

The bushing 130 is composed of two parts 25 and 26 having recesses 27 in their abutting faces which are so formed as to snugly receive the head 24 of the stud 140.

The recesses 27 are preferably premolded and of such size as to snugly and frictionally engage the stud when it is placed therein. The bushing sections 25 and 26 are shaped to snugly fit the shell as in the case of the bushing 13 with the same advantages. It will be noted that in both modifications the principal mass of the bushing lies adjacent the flat faces of the stud. In this way a maximum amount of bushing material is provided for allowing movement of the stud due to the inter-particle flow of the bushing material.

Also in this modification, the rod 110 does not extend inwardly to the bushing member but, instead, the shell sections are welded together about a flared metallic seat 28 which serves as a closure for one end of the socket. The neck portion 20 therefore extends as a hollow cylinder and the rod 110 is inserted and may be welded or otherwise secured therein to complete the assembly.

It will be noted that in both modifications the shells can be easily and readily attached to different sized rod members and in assembling, the socket members can be placed on the rods so that the openings therein can be located at various angles to each other. Due to this type of construction a number of minor variations can be made in the assembled link without involving the costly use of various forming dies.

It will be understood that all the illustrated embodiments of the modifications of this invention have been shown in Figures 6 and 7 but that such modifications can be applied singly or together or any combination thereof to the device as shown in Figure 1.

It will be seen that this invention provides a link assembly which may be used wherever a connecting rod is needed. The particular construction of the stud member provides for its inexpensive manufacture and also when used with the combination as set out provides the necessary rotative and angular movement required of such a member.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. In a link assembly, a socket comprising two recessed shells welded together along adjacent face edges, said shells having cut away portions adjacent their welded edges to form an opening in said socket, a stud extending through said opening and having a flat head portion in said shell, and a pair of rubber bushing members having adjacent faces recessed to receive said stud head tightly compressed within said socket.

2. In a link assembly, a socket comprising two recessed shells welded together along adjacent face edges, said shells having cut away portions adjacent their welded edges to form an opening in said socket, resilient bushing members in said shell with their abutting faces adjacent the opening in said socket, said bushings having recesses in their abutting faces and a stud member having a flat octagonal head thereon passing through said opening with the head snugly received by the recesses in said bushing members.

3. In a link assembly, a socket member comprising two elongated recessed shells having semi-cylindrical extensions thereon, said shells and extensions having their face edges welded together, said extensions being adapted to be welded to the end of a rod, a resilient bushing molded to the shape of the socket compressed within said shells, said bushing having a narrow recess therein, transversely thereof, said shells having cuts in adjacent edges which, when the shells are welded together, form an opening in the socket, and a stud member passing through said opening and having a flat head portion larger than said opening imbedded in the bushing recess and frictionally gripped by said bushing so that movement between the stud and socket is permitted only due to the inter-particle flow of the bushing material.

4. In a link assembly, a socket member comprising two shells secured together and having an opening thereinto, said shells together forming a hollow neck at one end, a rod fitted and welded in said neck, said rod including a flared end portion disposed in the socket and having its extreme inner end recessed and disposed spherically flush with the inner surface of the socket, a rubber bushing compressed within said socket and having a narrow slot therein aligned with the socket opening, and a stud member passing through said opening and having a flat head snugly received in the slot in said bushing so that movement between the stud and socket is permitted only as a result of inter particle flow of the material of the bushing.

5. In a link assembly, a rod including an outwardly flared end portion, a plurality of recessed shells secured together along adjacent edges defining an oval socket partially spherical at the ends and including a substantially cylindrical hollow neck, the flared end of said rod being fitted and permanently secured in said neck and having a recessed end spherically flush with the inner surface of the socket.

6. In a link assembly, a housing formed of sheet metal sections welded together along the edges thereof, said metal sections having cut away portions adjacent the welded edges defining an elongated opening giving entrance to the housing, a resilient rubber bushing in said housing having a preformed narrow slot extending transversely thereof adjacent the elongated opening in the housing, and a stud member having a flattened head seated in the slot in said bushing and completely surrounded by said bushing, the diameter of said stud head being greater than the minor axis of said housing opening and less than the major axis of said opening, so that the stud head may be locked in the housing by insertion through the housing opening lengthwise thereof and rotating it through an angle of 90° to be seated in the slot of the bushing, movement between the stud and the housing being permitted by inter-particle flow of the rubber bushing.

7. In a link assembly, a socket member comprising two recessed shells welded together along the edges thereof, said shells having cut away portions adjacent the welded edges defining an elongated opening giving entrance to the socket, a rod welded to said shells and extending therefrom, a resilient bushing in said socket having a preformed narrow cavity therein, the long axis of said cavity being disposed at an angle to the major axis of said socket opening, and a stud member having a flattened head fully seated in said cavity and completely surrounded by said bushing, said stud head having a diameter slightly less than the major axis of the socket opening, whereby the stud head may be inserted through the housing opening longitudinally thereof and rotated through an angle to be seated in the bushing cavity and locked in the housing, movement between the stud and the housing being permitted by interparticle flow of the bushing.

RALPH F. PEO.